March 8, 1949. O. M. BURKHARDT 2,463,516
VENT DEVICE FOR PRESSURE COOKERS
Filed March 13, 1946
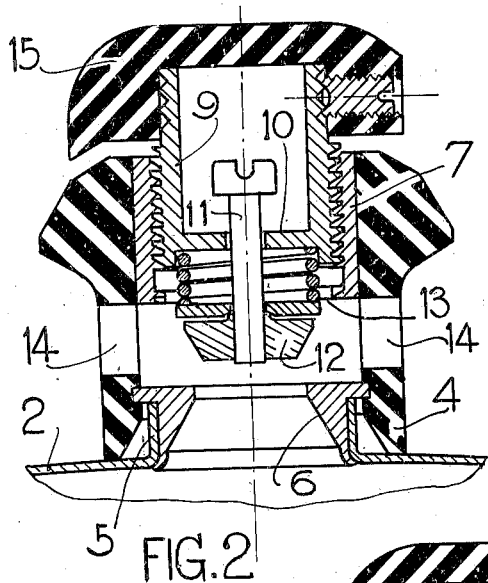
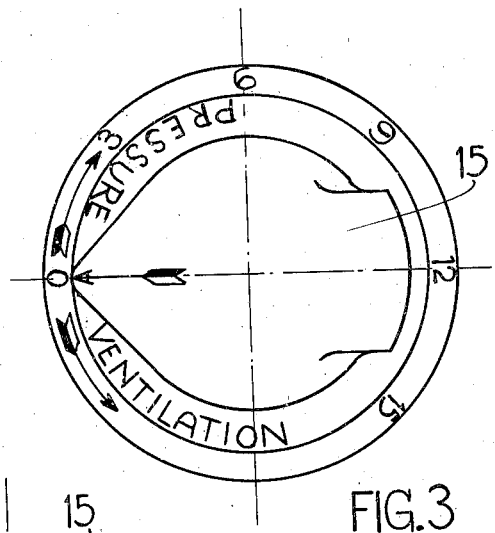
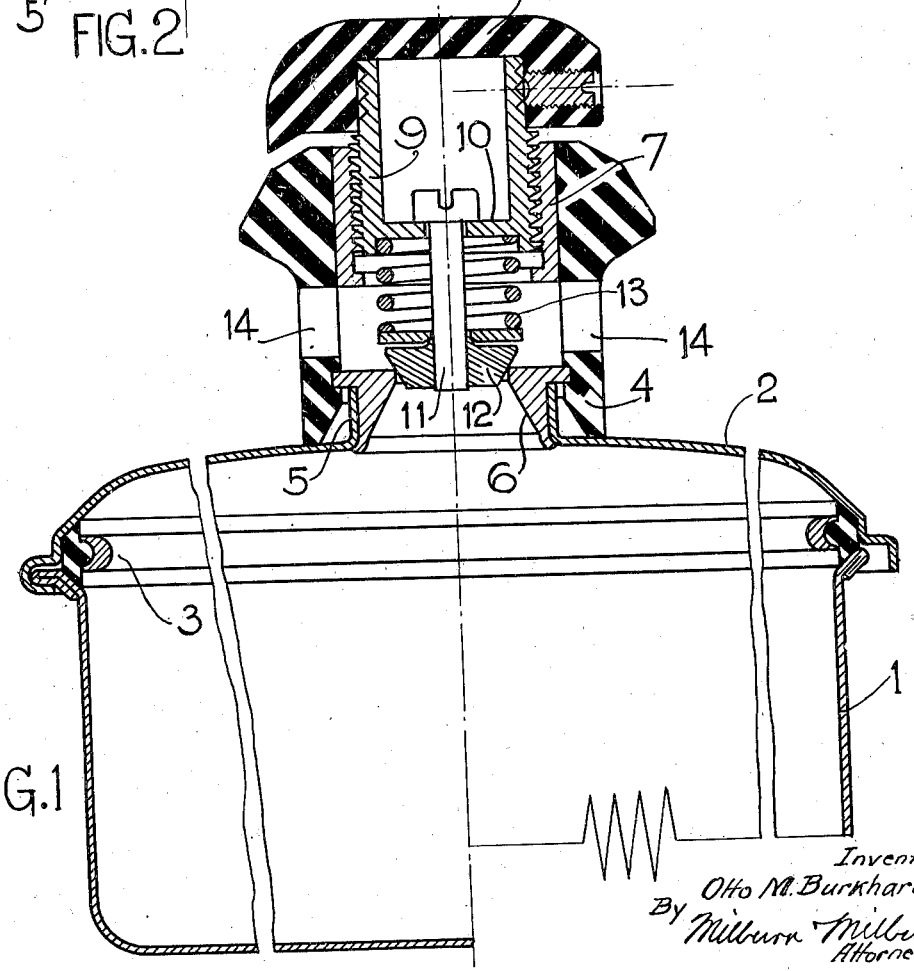
Inventor
Otto M. Burkhardt
By Milburn & Milburn
Attorneys Patented Mar. 8, 1949

2,463,516

UNITED STATES PATENT OFFICE 2,463,516

VENT DEVICE FOR PRESSURE COOKERS

Otto M. Burkhardt, Euclid, Ohio

Application March 13, 1946, Serial No. 654,001

3 Claims. (Cl. 137—53)

This invention relates to the art of pressure cookers, this application pertaining especially to a new form of pressure regulator and conforming in a general way to the basic conception embodied in my co-pending application Serial No. 530,547, filed April 11, 1944.

Pressure cookers are built to resist internal pressures several times that at which they are intended to be used. Conventional pressure cookers are provided with two means for the relief of internal pressure at certain predetermined points. In many cases a rubber patch or plug is employed to seal a hole in the wall of the utensil, but this will deteriorate in time and the first outward sign of such deterioration is likely to be in the form of an explosive discharge of the contents of the cooker out through this hole, which of course might prove to be a very serious accident. Other means used in conventional cookers consists of a weight loosely covering a vent hole so as to seal it until the pressure within the cooker overcomes this weight. This method of regulating the pressure has many serious disadvantages, due largely to the comparatively long and narrow vent hole usually found in such devices and the danger of the same becoming clogged by the contents of the cooker. Long vent holes of relatively small diameter are easily clogged by such substances as seeds, leaves and starches; and, as such can not be easily washed or inspected, such clogged holes frequently permit pressure within the cooker to increase to the point of a dangerous explosion, without such pressure being indicated by any means provided for that purpose. A common phenomenon is that such a clogged vent remains clogged until the internal pressure rises to a point sufficient to blow out the conglomerate in the vent, whereupon there is an explosion to such an extent that the weight is blown off the relief vent with possible damaging effect; or the vent may remain clogged, with the weight aggravating the clogging, until the rubber patch or plug is blown out with similar explosive discharge. Moreover, loose weights can seal effectively only if the utensil is at rest and occupies upright position. However, in actual use, cooking utensils are often subjected to jerking, shaking and tilting movements; and, with a loose weight resting upon a vent hole, such jerking, shaking and tilting movements seriously interfere with sealing to such an extent that such an inadvertent movement of the cooker often causes frightening emission of pressure. Also, a loose weight in tilted position exerts a side component and hence loses at least part of its effectiveness in sealing. Moreover, if the cooker upsets, as is practically bound to happen now and then, the weight falls off and that again might cause an explosive discharge of the contents of the cooker out through the vent.

The general object of my present invention is to overcome the above-mentioned serious defects and to attain many new desirable results in a pressure cooker.

Accordingly, one object of my present invention is to provide a pressure cooker with a pressure regulator which gradually yields at predetermined pressures but which at no time nor at any pressure can be blown out of operative sealing relationship, so that it continuously tends to seal effectively, any excess pressure being dissipated so as to prevent accidental discharge of the entire contents of the cooker.

Another object is to provide a pressure regulator that is capable of sealing a large vent of a pressure cooker up to a predetermined pressure and that is so conceived that by no connivance can it be altered to increase this predetermined pressure except by a small margin desirable for increased efficiency.

Another object is to provide a pressure regulator for a pressure cooker with a vent passage so large in diameter and so short in length that no conglomerate of leaves, seeds and starches can effectively clog this passage, advantage being taken of the fact that the structural strength of such conglomerate is limited.

Another object is to provide such a vent means with a passage of such large diameter and of such short length that washing of this passage is greatly facilitated although washing is not imperative for safety since ordinary use suffices to keep the large passage free from conglomerate.

Another object is to provide a pressure cooker with a vent means having sharp edges so that escaping pressure may exert a cutting action upon any food particles and may hence automatically keep the large but short passage free at all times.

Another object is to provide such a device in which the sharp edges of the vent passages may be utilized as a means for producing a sound which may be depended upon to serve as a signal that the desired pressure has been reached.

Another object is to provide a vent means that may be easily taken apart and in which the parts are so exposed as to be virtually self-cleaning since all concealed crevices are avoided in my present form of structure.

Another object is to provide a pressure regulator for a pressure cooker which may easily be set to vent at any desired pressure from zero to a predetermined maximum so as to permit of the use of the most economic cooking method for the widest variety of foods and beverages.

Another object is to provide a pressure regulator for a pressure cooker which will remain sealed if the internal pressure is below that selected even if the cooker is accidentally subjected to jerking or tilting or is even upset, thereby preventing premature discharge of pressure which is alarming when unexpected.

Another object is to provide a pressure regulator in which the sealing member is held upon its seat according to any selected amount of pressure desired, and which when this selected amount is reached, will permit venting only in proportion to the amount of excess pressure and thereby permit of an increasing venting only when an excess pressure accumulates and only until a balance is reached but without this vent passage ever becoming entirely uncovered or the sealing member removed from its sealing relationship to the vent opening.

Another object is to support this yielding vent means by an inclined surface engagement so that, at the end of the cooking process, pressure may be relieved very gradually, preferably at one-pound intervals which will prevent the food from being blown out of the cooker by the total pressure drop existing between the container interior and the surrounding atmosphere.

Another object is to devise a pressure cooker with a pressure regulator provided with such adjustments that venting may take place at comparatively low internal steam pressures but with the sealing member always in position so that escape of steam pressure can be controlled to take place at any pressure desired.

Another object is to provide a pressure cooker in which the pressure regulating means not only serves for venting and the escape of steam pressure but serves also as a means of ascertaining the amount of pressure in the utensil, this arrangement permitting of a unique method of utilizing the vent means not only as a gauge but also as a chronometer inasmuch as the drop in pressure within the utensil may be interpreted as a measure of elapsed cooking time.

Another object is to do away with the need of a conventional safety plug which is now blown out at a certain pressure, such blow-out being practically a sure cause of accident.

Another object is to devise a pressure regulator for a pressure cooker in which all of the parts thereof are constantly maintained together so that they are all in proper position when the cooking operation is initiated without having to stop to look for the parts or to put them together.

Another object is to provide a pressure cooker with a venting means that is especially devised to conserve the heat and to preserve all vitamins in the food. Normally and especially when electric stoves are employed for supplying the heat for the cooking operation, and when the selected pressure has been reached and the vent unit permits escape of pressure, there is sufficient heat remaining in the heating unit not only to maintain that selected pressure for a considerable length of time but to actually raise it a small amount. Conventional venting means permit escape and loss of pressure, heat and vitamins and also valuable liquid that is required for moisture and pressure, with the accompaniment of noise while this residual heat is being expended. Accordingly, an object of the present invention is to permit and provide adjustment for a slightly higher pressure than the originally selected pressure so as to utilize this residual heat for cooking rather than to permit its loss and the escape of vitamins and valuable moisture which is essential in order to prevent burning.

Another object is to employ a vent opening of large diameter to ensure high specific pressure at the seating surfaces. This not only ensures a sharper cut-off when the selected pressure is reached but, if leaves or starches are upon the sealing surfaces, these are more readily divided and a metallic seating engagement is ensured. It is obvious that with a vent opening ten times as large in diameter as another one, there is available one hundred times the amount of pressure to overcome frictional resistance. Hence, with a large vent opening, the cut-off is far closer to the selected pressure because so much more pressure is available to overcome friction or other inaccuracies.

Another object is to provide such a device with a pressure regulating means which may be used as an auxiliary handle means for the more convenient lifting and general handling of the entire cooker or its cover.

Another object is to provide a pressure cooker with a pressure regulator which may serve also as a regulator in connection with the storage of heat within the cooker. This may best be illustrated by using coffee as an example. Very finely ground coffee yields best results when prepared in pressure cookers, storing only enough heat to be equivalent to three pounds pressure. The very best and quickest results with coarsely ground coffee are obtained if the pressure is raised to about five to ten pounds. The clearest and best coffee is obtained when whole coffee beans are subjected for a few minutes to a pressure of from fifteen to seventeen pounds.

Other objects will appear from the following description and claims when considered together with the accompanying drawing.

Fig. 1 is a vertical sectional view illustrating my present form of vent means embodied in a pressure cooker;

Fig. 2 is a partial view, in section, corresponding to Fig. 1 except that in Fig. 2 the plug valve of the vent means is shown in open position; and Fig. 3 is a top plan view of my vent means.

It is to be understood that the present form of disclosure is merely for the purpose of illustration and that there might be devised various modifications thereof without departing from the spirit of my present invention as herein set forth and claimed.

Referring to the present drawing, the container 1 has the closure 2 which may be provided with any suitable form of means for hermetically sealing engagement of the same upon the container in the region indicated by reference numeral 3. Also, the closure will be provided with suitable means for releasably locking the same upon the container.

Upon the top of the closure I have mounted the upright cylindrical member 4 about the upstanding flange 5 which surrounds an opening through the closure 2. The annular valve seat 6 is applied to the inside of the flange 5 and has its lower edge rolled outwardly beneath the corner of the closure opening. The internal surface of the member 4 is accurately machined so that a similarly accurately machined part 7 may have a pressed fit therewithin. The inner surface of the part 7 is provided with screw threads of steep lead and preferably of the buttress type with their upper threaded surfaces flat so that the mating threaded member 9 may be permitted to back up with least frictional resistance. The member 9 is cut out in its upper part so as to form a depressed seat 10 through which extends the bolt 11 which carries the conical valve 12 on its lower end and has its head at the upper end thereof in engagement with the top surface of the depressed seat 10. A calibrated coil spring 13 surrounds the bolt 11 and has bearing engagement with the under-side of the seat 10 and the upper side of the valve 12. The valve 12 has line-contact seating engagement upon the angular edge of the opening through the valve seat 6.

The sharp edge provided upon the valve seat 6 produces several advantages. First, if leaves or lumps of food should become lodged so as to cover the opening, the heat within the cooker will soften these particles; then the pressure, when leakage occurs, will tend with the aid of these sharp edges to cut the particles of food and will thus ensure that the food will transmit pressure to the valve 12 undiminished. In this connection it may be stated that the larger the diameter, the less will the pressure be impaired by obstruction in its transmission to the valve because the structural strength of any food conglomerate is not sufficient to resist.

Second, the sharp edge or line contact ensures high specific pressure which in turn ensures firm seating of the valve upon its seat itself in spite of leaves or starches which may be present. As an example, if the diameter of the vent hole is $$\frac{1}{\pi}$$

its circumference is unity and its cross-sectional area is $$\frac{.25}{\pi}$$

This means that $$\frac{.25}{\pi}$$

pounds pressure are required for each pound of pressure within the cooker. If the vent hole diameter were only $$\frac{.1}{\pi}$$

its circumference would then be only .1 and its cross-sectional area would be $$\frac{.0025}{\pi}$$

Assuming that in both cases the seating edge is equally sharp, then the specific pressure of the valve seat upon one unit length of the circumference of the large hole is ten times that incident to the small hole. Obviously, the higher seating pressures in conjunction with sharp edges will cut food and starches much more readily than the lower seating pressures incident to the smaller vent holes. Furthermore, the frictional resistance of any pressure regulating device is likely to be $$\frac{.0025}{\pi}$$

or more. Hence, with the small vent hole, one or more pounds of pressure within the cooker will be required to overcome friction only; whereas, with the large vent hole, only .01 pound or certainly less than one ounce of pressure within the cooker will suffice to overcome the friction of the pressure regulating device.

Also, the sharp edges serve to emit more noise when steam under pressure blows over them. Hence the sharp edges serve to signal the user when the boiling point is reached or when the selected pressure is attained.

It should be pointed out also that in my present device the passages are not only very large in diameter but are also very short. For instance, I use a spring to exert the pressure and this permits the use of very short passages. In case of conventional designs of cookers where dead weights are used, the dimensions of the weight become larger as the area of the hole is increased. Long slender holes clog much more readily than those of short and wide dimensions.

The large diameter of valve 12 ensures also easy cleaning of the passages and convenient visual observation that the passages are clear. Above all, the area of the vent hole is so large that no conglomerate of food particles may constitute a sufficiently strong obstruction to seal and resist the pressure at which the valve is set to permit the escape of pressure. The object is to make the vent opening so large that it will not become clogged or rendered ineffective in the performance of its function. All parts are practically self-cleaning insofar that only conglomerates could cause trouble and the passages are so short and wide that ordinary use will itself dispose of what would otherwise accumulate as a conglomerate.

The lower end of the member 9 is spaced from the valve seat 6 to a substantial extent and this space corresponds to and is in transverse line with the diametrically opposite openings 14 through the member 4. The large size of the passage from the valve opening out through the openings 14 is important in the prevention of the clogging of food. At the upper end of member 9 there is attached by means of a set screw, a pointer 15 which will serve as an indicator in setting the member 9 by means of its screw-threaded engagement. A dial will be provided upon the top of the member 4, the top surface of this member being enlarged for this purpose, so as to indicate the pressure within the cooker. As will be understood, the turning of member 9 inwardly will cause compression of the calibrated spring in exact proportion to the amount of turning and hence a determinable amount of pressure will be required to lift the valve from its seat and this amount of pressure will be in exact relation to the amount that member 9 has been turned inwardly. If the vent hole be large, this spring pressure has to be large; and it is much easier to produce accuracy with a heavy spring. Also, an area of vent one hundred times as great as an undesirable one, requires one hundred times the spring pressure. This makes it possible to get away from sensitive light springs which are easily influenced by friction or damaged in use. Also, one hundred times the spring pressure is distributed over only ten times the circumference, thereby giving ten times the specific seating pressure. High specific seating pressure is desirable in order to make a valve respond accurately to rise and fall in pressure. When the pressure within the cooker reaches a point which is greater than that of the spring tension, the valve will be lifted from its seat and there will be relief of internal pressure out through vent openings 14. Any conglomerate of food under the valve will lack structural strength and not act as a wall but will transmit pressure and open the valve to permit relief.

When the cooker is placed over a source of heat and the valve is in "vent" position, vapor will form within the container and will slowly displace the air therewithin by forcing it out through the vent opening. When the boiling point is reached and steam is generated at a much faster rate within the cooker, the hissing sound caused by the escaping steam as it passes over the sharp edges, will attract the attention of the user who will then set the pressure indicator at the point of desired pressure which, according to the food to be cooked, may be anywhere from zero to fifteen pounds depending upon the nature of food being prepared in the cooker. In setting the indicator, the threaded member is screwed downwardly so as to compress the spring and force the sealing valve plug against its seat with a pressure entirely proportional to the extent of the turning of the indicator. Then, when the internal pressure, for which the indicator has been set, is attained within the cooker, it will lift the sealing valve plug and escape, thereby producing again a hissing sound which will serve as a signal to the user.

It is an advantage of this valve, with various selectable pressures, that when the pressure selected for the processing of a certain food has been reached and the hiss indicates this condition, the hiss can be stopped by setting the pressure selector at a slightly higher pressure. Then, while any accumulated heat is still transferred from the heating unit to a utensil, the warning hiss will stop provided that the heat supply has been cut off or reduced. If not, then the hissing sound will continue. The continued hissing is accompanied by loss of moisture and should be avoided for best results. Many foods are finished when the specified pressure is reached. In order to prevent any loss of vitamins, the heat should be turned off at once when the hissing sound occurs. Then in order to utilize the residual heat without further loss of vapor, the pressure should be permitted to rise a small amount. This permits of the simplest cooking process and ensures a minimum loss of vitamins and the least required amount of water; all of which expedites the obtaining of best results.

In many instances the contents of the cooker will be sufficiently processed before the pressure drops to zero after turning off the heat under the container. In some cases, however, it may be desired to continue to supply some heat to the cooker although to a much less extent than was required to bring about the predetermined pressure. When the time required for the processing or cooking of the food has elapsed, then the cooker may be left to stand until the food is to be served; or the indicator may be turned to "vent" position, whereupon the steam will escape and thereby reduce the pressure to zero. It is obviously an advantage, when food is cooked which must remain under pressure for a considerable length of time, to reduce the heat so that the hissing will stop. This will stop also loss of vapor and vitamins, as above explained. The pressure selector may then be used to check the pressure and to regulate the heat supply so that it suffices to hold the pressure at a maximum point without causing the hissing and consequent loss of vapor, vitamins and heat.

What I claim is:

1. In a pressure cooker, a vent device comprising a valve casing having an inlet opening in one end thereof and having lateral outlet means therethrough in communication with said inlet opening and in close proximity thereto, a sleeve having adjustable screw-threaded engagement co-axially within that part of said casing opposite said inlet opening and beyond said outlet means, a valve mounted upon only the inner end portion of said sleeve and enclosed within said casing and sleeve and adapted to close said inlet opening, a spring urging said valve to closed position, said casing having a cap portion, said sleeve having a separate cap portion mounted thereupon and adapted for engagement with the outer end of said casing so as to constitute a stop means for restricting the adjustable movement of said sleeve to the region beyond said outlet means and for limiting the degree of tension that may be applied to said spring, the cap portion of said casing being provided with a dial, and the cap portion of said sleeve having means for setting the same in adjusted position thereupon and being provided with a pointer for adjustable movement with respect to said dial so as to serve as an indicator means in connection therewith, said spring, screw-threaded engagement and indicator means being calibrated with respect to the pressure within said inlet opening so that said valve may be set for sealing up to and for opening at a predetermined pressure within said inlet opening according to the reading of said indicator means.

2. In a pressure cooker, a vent device comprising a valve casing having an inlet opening in one end thereof and having lateral outlet means therethrough in communication with said inlet opening, a sleeve having screw-threaded engagement co-axially with that part of said casing opposite said inlet opening and beyond said outlet means, a valve operatively mounted upon said sleeve and enclosed within said casing so as to be protected thereby and adapted to close said inlet opening, a spring urging said valve to closed position, said casing and sleeve having interengaging stop means for restricting the adjustable movement of said sleeve to the region clear of said outlet means and for limiting the degree of tension that may be applied to said spring, and said casing and sleeve being provided with an indicator means including companion dial and pointer members and including means for setting one of said members in adjusted position with respect to its mounting, said spring, screw-threaded engagement and indicator means being calibrated with respect to the pressure within said inlet opening so that said valve may be set for sealing up to and for opening at a predetermined pressure within said inlet opening according to the reading of said indicator means.

3. In a pressure cooker, a vent device comprising a valve casing having an inlet opening in one end thereof and having lateral outlet means therethrough in communication with said inlet opening, a sleeve having a screw-threaded engagement co-axially with that part of said casing opposite said inlet opening and beyond said outlet means, a valve operatively mounted upon said sleeve and enclosed within said casing so as to be protected thereby and adapted to close said inlet opening, a spring urging said valve to closed position, said casing and sleeve having interengaging stop means for restricting the adjustable movement of said sleeve to the region clear of said outlet means and for limiting the degree of tension that may be applied to said spring, said casing having a cap portion provided with a dial, and said sleeve having a separate cap portion with means for setting the same in adjusted position thereupon to serve as an indicator means in conjunction with said dial, said spring, screw-threaded engagement and indicator means being calibrated with respect to the pressure within said inlet opening, so that said valve may be set for sealing up to and for opening at a predetermined pressure within said inlet opening according to the reading of said indicator means.

OTTO M. BURKHARDT.

REFERENCES CITED

The following references are of record in the file of this patent:

UNITED STATES PATENTS

| Number | Name | Date |
|---|---|---|
| 347,213 | Walker | Aug. 10, 1886 |
| 372,503 | Wheeler | Nov. 1, 1887 |
| 1,033,136 | Wennersten | July 23, 1912 |
| 1,328,653 | Ferris | Jan. 20, 1920 |
| 2,051,100 | Nelson | Aug. 18, 1936 |
| 2,107,704 | Kronquest | Feb. 8, 1938 |
| 2,295,154 | Brower | Sept. 8, 1942 |